United States Patent
Hopson, III et al.

(10) Patent No.: US 10,182,159 B2
(45) Date of Patent: Jan. 15, 2019

(54) CONFIGURATION OF SHARED TRUNK GROUPS IN AN IP TELEPHONY NETWORK

(71) Applicant: GENBAND US LLC, Frisco, TX (US)

(72) Inventors: James D. Hopson, III, Raleigh, NC (US); Natalia Priluka, Mississauga (CA); Xuewen Li, Cary, NC (US)

(73) Assignee: GENBAND US LLC, Plano, TX (US)

( * ) Notice: Subject to any disclaimer, the term of this patent is extended or adjusted under 35 U.S.C. 154(b) by 182 days.

(21) Appl. No.: 14/858,646

(22) Filed: Sep. 18, 2015

(65) Prior Publication Data
US 2017/0085596 A1   Mar. 23, 2017

(51) Int. Cl.
*H04L 29/06* (2006.01)
*H04M 7/00* (2006.01)

(52) U.S. Cl.
CPC ........ *H04M 7/009* (2013.01); *H04L 65/1006* (2013.01); *H04L 65/1053* (2013.01); *H04L 65/1073* (2013.01); *H04M 7/006* (2013.01)

(58) Field of Classification Search
CPC ............ H04L 65/1066; H04L 65/1006; H04M 7/009; H04M 7/006
See application file for complete search history.

(56) References Cited

U.S. PATENT DOCUMENTS

| | | | | |
|---|---|---|---|---|
| 5,828,746 A | * | 10/1998 | Ardon | H04Q 3/0016 379/157 |
| 7,873,032 B2 | * | 1/2011 | Silver | H04W 76/10 370/353 |
| 2006/0146792 A1 | * | 7/2006 | Ramachandran | H04L 12/6418 370/352 |
| 2007/0116228 A1 | * | 5/2007 | Schneider | H04M 15/06 379/211.01 |
| 2008/0159516 A1 | * | 7/2008 | Freeman | H04M 3/4228 379/221.14 |
| 2010/0265938 A1 | * | 10/2010 | Fullarton | H04L 65/1006 370/352 |
| 2011/0072141 A1 | * | 3/2011 | Veenstra | H04L 65/1016 709/228 |
| 2011/0189985 A1 | * | 8/2011 | Gao | H04M 3/4234 455/422.1 |
| 2012/0140774 A1 | * | 6/2012 | Oster | H04L 45/00 370/401 |

(Continued)

*Primary Examiner* — Khaled M Kassim
*Assistant Examiner* — Syed Ali
(74) *Attorney, Agent, or Firm* — Fogarty LLP

(57) ABSTRACT

System and methods are disclosed for configuring the sharing of resource pools and individual resources in the resource groups among enterprise communication systems. In certain embodiments, the resource pools are trunk groups and the individual resources that comprise the trunk groups are communication resources. Digital PBXs components associated with different enterprise communication systems are registered and assigned shared use of a trunk group. Communication services are provided to the digital PBXs using the channels of the shared trunk group. Each enterprise may reserve channels within the trunk group for exclusive use by the enterprise, while sharing use of other channels in the trunk group. Each enterprise can be guaranteed a minimum calling capacity while providing improved resource utilization due to fewer idle communication channels.

14 Claims, 2 Drawing Sheets

(56) References Cited

U.S. PATENT DOCUMENTS

| | | | | |
|---|---|---|---|---|
| 2012/0204252 A1* | 8/2012 | Silver | ................... | H04L 12/66 |
| | | | | 726/12 |
| 2013/0051546 A1* | 2/2013 | Fried | .................. | H04M 3/5231 |
| | | | | 379/265.02 |
| 2014/0098945 A1* | 4/2014 | Terpstra | .............. | H04L 65/1046 |
| | | | | 379/90.01 |
| 2015/0381802 A1* | 12/2015 | Mendiratta | ......... | H04M 3/4217 |
| | | | | 455/414.1 |
| 2018/0083830 A1* | 3/2018 | Pendleton | ............... | H04L 67/20 |

* cited by examiner

CONFIGURATION OF SHARED TRUNK GROUPS IN AN IP TELEPHONY NETWORK

TECHNICAL FIELD

This disclosure relates generally to improvements in configuration of IP telephony networks, in particular the configuration of shared trunk groups in an IP telephony network.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

One advantage of IP telephony is the ability to leverage the physical infrastructure used to support the Internet. In the traditional Public Switched Telephone Network (PTSN), adding a new line requires a dedicated analog two-wire circuit to the subscriber's building and dedicated circuits within the building for each handset. In IP telephony, communication services can be extended to almost any internet-connected device. An IP telephony network can support large numbers of simultaneous calling sessions using the infrastructure of the Internet to transmit call data. However, practical limits exist on the number of calls that can be simultaneously supported by the network devices used to provide IP telephony services. Network devices have finite amounts of memory and processing power with which to process and transmit the call data in real time. Additionally, maintaining acceptable quality of service results in the available network bandwidth being divided into virtual communication channels. An IP telephony system must manage the inventory of available communication channels and allocate channels to authorized participants.

IP telephony networks typically utilize Session Initiation Protocol (SIP) for setting up and establishing (i.e., terminating) communication sessions via the Internet. A SIP connection is an individual communication session between two devices. Each SIP connection may support a voice call and/or other multimedia communication over a virtual communication channel linking two remote parties. Whereas a SIP connection supports an individual communication session, a SIP trunk is a link that supports transmission of multiple simultaneous SIP sessions. In some scenarios, a SIP trunk is a high-bandwidth Internet connection from a network service provider (NSTP) to the IP PBX or other network device of an enterprise IP communication system. In other scenarios, a SIP trunk is provided as a service over a shared ISP connection with other services. A SIP trunk can support a specific number of simultaneous SIP sessions, which can be allocated as needed among the users of an enterprise system. The capacity of a SIP trunk is represented by the number of virtual channels it supports, each virtual channel supporting a single communication session between two devices.

In order to increase communication capacity, an enterprise communication system may retain the services of multiple SIP trunks, which can then be logically grouped into SIP trunk groups. In some cases, a SIP trunk group may be dedicated to a particular facility of the enterprise, where the facility is provided IP telephony service using IP PBX. In other cases, a SIP trunk group can be used by multiple facilities of the enterprise, each provided IP telephony services by a separate IP PBX. However, reserving a SIP trunk group for exclusive use of the enterprise will frequently result in significant portions of the SIP trunk group capacity remaining unused. Similar to a traditional PTSN line, a conventional allocation that dedicates a SIP trunk group to an enterprise system results in idle capacity when the available channels are not used. Although a certain amount of capacity overhead is desirable, enterprises and providers of unified communication services would prefer to increase utilization of available network resource by reducing idle channels in shared SIP trunk groups.

In order to improve utilization of the SIP trunk group capacity, a service provider may prefer to share a SIP trunk group among multiple enterprises. With more enterprises utilizing a SIP trunk group, fewer of the communication channels provided by the SIP trunk group will sit idle. However, by sharing a SIP trunk group with other communication systems, enterprises run the risk that calling resources will be in use by these other systems when a user of the enterprise system attempts to establish a session. Consequently, there is need for the ability to configure the sharing of SIP trunk groups within a group of participating enterprises, but still provide individual enterprises with certain guarantees of available capacity that is reserved for exclusive use of the enterprise. Furthermore, despite the fact that a SIP trunk group may be shared between various locations using various network devices, unified communication systems require a centralized tool that is capable of configuring all of the network devices needed to implement sharing of a SIP trunk group. Another difficulty posed by sharing of SIP trunk groups is the management of available channels in a manner that allows an arbitrary channel to be utilized by any participating enterprise while also ensuring that the capacity limits on each individual enterprise are still enforced.

SUMMARY

Embodiments disclosed herein are directed to system and methods for sharing resource pools and the communication resources that comprise the individual resource pools. For example, disclosed embodiments provide the ability to share trunk groups and to share the capacity provided by the individual trunk groups. Embodiments provide the ability to assign reserved/dedicated trunk capacity to an enterprise within the shared trunk group while also providing the ability to share trunk capacity with other enterprises that are sharing the trunk group. Embodiments allows for defining a minimum floor of reserved channels that are always available for calls to that rate center, while keeping a (usually larger) set of channels that can be shared among customers.

In an illustrative embodiment, a communication network is configured to share a resource pool and the communication resources that comprise the resource pool among different enterprise communication systems. A first plurality of PBXs associated with a first enterprise communication system and second plurality of PBXs associated with a second enterprise communication system are registered. A first resource pool is assigned for shared use by the first plurality of digital PBXs and the second plurality of PBXs, wherein the first resource pool includes communication resources for providing communication services to the first plurality of digital PBXs and the second plurality of digital PBXs. A first portion of the communication resources are reserved for use by the first plurality of digital PBXs. A second portion of the communication resources are specified for shared use by either the first plurality of PBXs or second plurality of PBXs.

In another embodiment, a third portion of the communication resources are reserved for use by the second plurality of digital PBXs. In another embodiment, a first maximum number of communication resources is specified representing the number of resources that may be simultaneously used by the first plurality of digital PBXs. In another embodiment, a first session manager is assigned to provide a first communication service to the second plurality of digital PBXs, wherein the first session manager provides the first communication service to the second plurality of digital PBXs using the communication resources, wherein the first session manager does not use the first portion of communication resources and wherein the first session manager uses the second portion of communication resources. In another embodiment, a fourth portion of the communication resources are reserved for expanding ongoing communication sessions, wherein the ongoing communication sessions are conducted via resources from the first portion of the communication resources. In another embodiment, the first enterprise communication system is associated with a first internet domain and the second enterprise communication system is associated with a second internet domain. In another embodiment, a second session manager is assigned to continue the first communication service, wherein the first communication service is not terminated in transitioning from the first session manager to the second session manager. In another embodiment, the number of resources in the first portion of the communication resources is specified as a percentage of the first maximum number of communication resources. In another embodiment, one or more directory numbers associated with a PBX of the first plurality of digital PBXs are specified. In another embodiment, the first plurality of digital PBXs are reassigned to a second resource group in response to detecting insufficient capacity in the first resource group.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items. Reference will now be made to the accompanying drawings, wherein.

DETAILED DESCRIPTION

Embodiments disclosed herein are directed generally to configuring and providing real-time communications with an embedded client of a virtual desktop environment.

The term "communications," as used herein, is intended to encompass voice communications or telephony, as well as other forms of communications (e.g., video communications, videoconferencing, instant messaging or IM, Short Messaging Service or SMS, emits, etc.) that may take place electronically, for example, over wireless networks, circuit-switched networks, packet-switched networks, or any combination thereof. As such, a reference to a "call" in the description of embodiment of the claimed invention may encompass a voice call, a video call or a data message.

Figure 1:
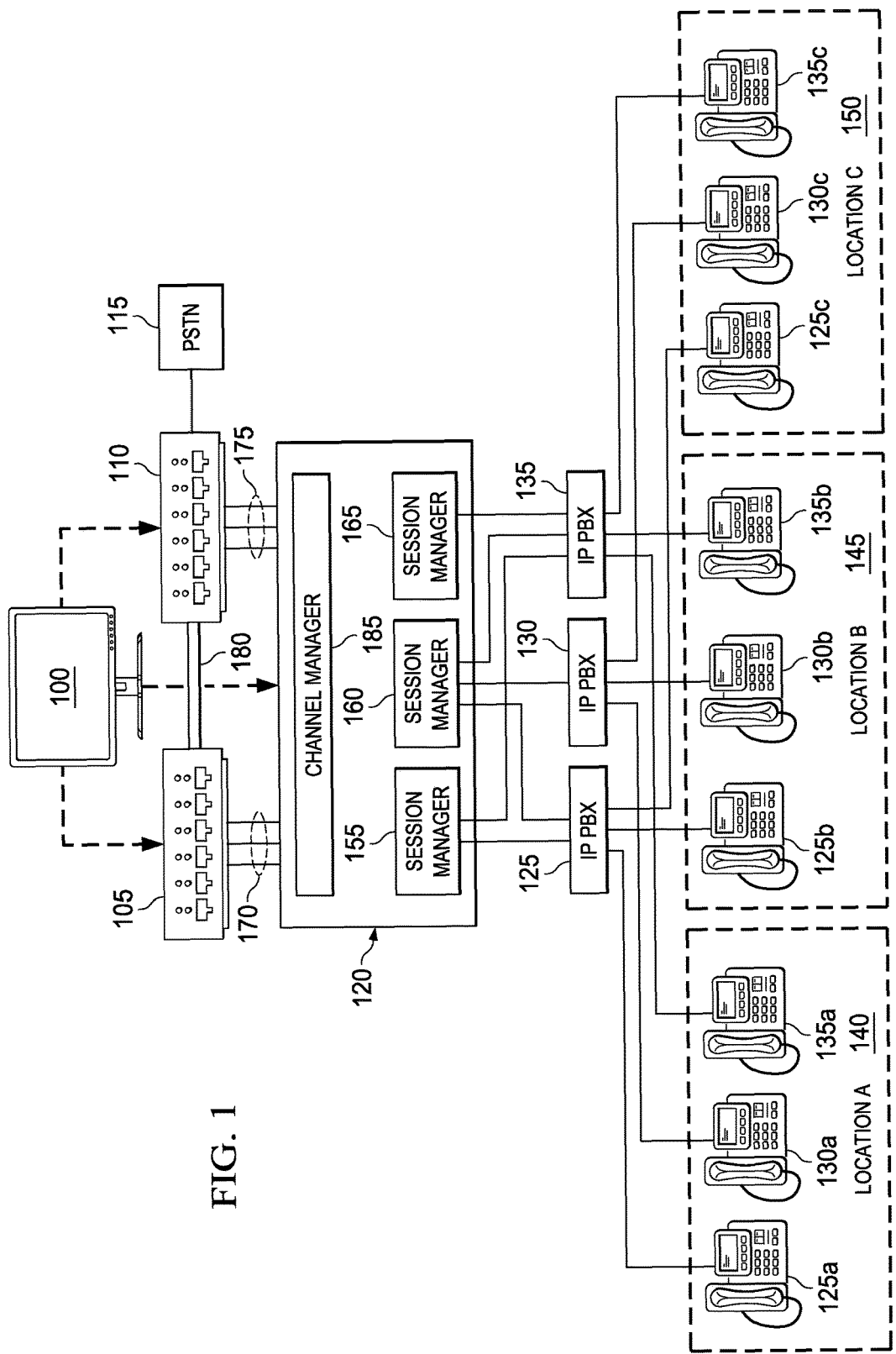
FIG. 1 is a block diagram illustrating components of a system that is configured according to various embodiments to implement sharing of a SIP trunk group.

FIG. 1 illustrates a system for configuring a shared SIP trunk group according to various embodiments. In the system of FIG. 1, unified communications are provided to a geographically diverse set of users 125a-c, 130a-c, 135a-c. In the illustrated embodiment, the users 125a-c, 130a-c, 135a-c are provided with IP telephony services via a communication system consisting of IP softswitch devices 105, 110 and unified communications server 120.

The IP softswitch devices 105, 110 transfer session data between them via a dedicated trunk 180. The IP softswitch devices 105, 110 are also responsible for transferring voice data between the unified communication system and the conventional PSTN 115. The unified communication server 120 is responsible for providing IP telephony services to users 125a-c, 130a-c, 135a-c by interfacing with IP PBX devices 125, 130, 135, each of which connects the users of an enterprise IP telephony system.

Each IP softswitch 105, 110 is connected to the unified communication server 120 via a SIP trunk group. IP softswitch 105 is connected to the unified communication server 120 via SIP trunk group 170. In the illustrated embodiment, SIP trunk group 170 consists of three SIP trunks. Each of the trunks provides capacity for a specific number of channels between users 125a-c, 130a-c, 135a-c of the unified communication system and external participants located on the PSTN 115. Each channel provides a communication pathway for a SIP session between one of the internal users 125a-c, 130a-c, 135a-c and an external PSTN 115 participant.

In some embodiments, resource other than communication channels may be shared between enterprise communication systems. Embodiments may provide communication services to the enterprise users using various types of shared communications or processing resources. These resources may be combined into resource pool that are shared between enterprise users in order to improve utilization of the resources that comprise the resource group. Such embodiments utilize shared resources to provide communication services while maintain the ability to track the enterprise associated with each communication session, thus maintaining rate center tracking for each enterprise.

As described above, conventional systems typically dedicate an individual SIP trunk to service the communication sessions for a single enterprise communication system. Enterprises may require guarantees of calling capacity from an IP telephony system. As such, enterprises will reserve exclusive use an SIP trunk and the channels that are provided. In some instances, multiple trunks are grouped and reserved for the use of an enterprise system. Each trunk that is added to the group serves to multiply the number of channels available to users of the enterprise system.

However, as described, reserving exclusive use of a SIP trunk by a single enterprise will result in unused capacity when all of the channels made available by the SIP trunk are not used by the enterprise. An enterprise communication system providing IP telephony must be able to accommodate peak calling volumes. Consequently, an enterprise may require that the amount of SIP trunk capacity that is reserved must provide sufficient channels to meet peak demand. Reserving exclusive use of SIP trunk group increases capacity available to the enterprise, but also increases the capacity that may be sitting idle. With each enterprise communication system individually reserving peak capacity in this manner, a significant amount of unused capacity can result within the unified communication system implemented by the IP softswitch devices 105, 110 and unified communications server 120.

This unused SIP trunk capacity can be decreased by allowing communication systems operated by different enterprises to share the capacity provided by a SIP trunk group, in order to share a SIP trunk group across enterprise systems, the unified communication system must be able to associate individual calls to an enterprise system for billing purposes. In addition, enterprise systems may still be required to provide some guarantee of calling capacity. The claimed invention provides the ability to easily configure a unified communication system to provide shared SIP trunk groups in a manner that allows capacity to be shared amongst participating enterprise communication systems while still allowing certain capacity guarantees to be provided Another aspect of implementing sharing of a SIP trunk group is that the many participating enterprises are individually constrained by a limit on the number of simultaneous channels that they can utilize. Unlike conventional PTSN systems where the call volume an enterprise could support was limited by the number of physical circuits that were present, no analogous physical limit is present in an IP telephony system on the number of simultaneous sessions that may be utilized by an enterprise. Accordingly, unified communication systems enforce an upper limit on the number of channels that an enterprise has been authorized to use at any one time. This enterprise channel limit may be used to establish tiered pricing models for enterprise communication systems.

In the embodiment illustrated in FIG. 1, a remote administrator 100 is provided with a graphical interface by which to configure the IP softswitches 105, 110 and the unified communication server 120 of the unified communication system to provide sharing of SIP trunk groups. More specifically, the remote administrator 100 can configure the sharing of SIP trunk group 170 and SIP trunk group 175 between three different enterprise communication systems, each of which is accessed via an IP PBX device. In certain embodiments, the remote administrator 100 is also provided with an operations support system (OSS) interface that supports integration into service provider back office provisioning automation systems.

In certain embodiments, the three enterprise communication systems represented by IP PBXs 125, 130, 135 are owned by three different companies and are thus distinct customers and rate centers within the unified communication system. Communication sessions involving difference enterprise systems must be separately tracked by a unified communication system in order to associate calling charges on any channel back to the correct rate center. The unified communication system must also be able to manage the available capacity of the channels in a shared SIP trunk group such that guarantees to individual enterprise systems are honored and enterprise channel limits are enforced. In certain embodiments, resources pools other than trunked groups of communication channels may be shared between the enterprise communication systems. In such embodiments, enterprises maintain the ability to reserve resources from the resource pool, white also maintaining the ability to share certain of the pooled resources.

In certain embodiment, contention for available resources may trigger the reassignment of an IP PBX to a new trunked group. As available channels in a trunked group become scarce due to heavy use of the available communication channels, certain embodiments of the unified communication server provide the ability to configure dynamic reassignment of an IP PBX to a different trunk group. Such reassignment results in different communication channels being designated as available for use by the IP PBX. Embodiments are able to complete this reassignment to new communication channels while maintaining any ongoing communication sessions being managed by the IP PBX.

In the embodiment illustrated in FIG. 1, a first enterprise system is comprised of IP PBX 125, which provides voice services to three users 125*a-c*, each of which is located at a different geographic location, 140, 145 and 150, respectively. Similarly, a second enterprise system is comprised of IP PBX 130, which provides voice services to three users 130*a-c*, each of which is located at a different geographic location, 140, 145 and 150, respectively. Each of the IP PBXs 125, 130, 135 provide communications services for communications within an enterprise system. For instance, IP PBX 125 supports a voice call made from user 125*a* at Location A to user 125*c* at Location C. Since the both participants are part of the enterprise system of IP PBX 125, the call is managed directly by IP PBX 125, which receives the call request from user 125*a*, sets up the call and terminates the call to user 125*c* via IP softswitch 105 and/or 110. However, for calls where the enterprise user is communicating with an external PTSN participant 115, the unified communication system interfaces with the IP PBX 125 of the enterprise system and manages the connection to the external PTSN participant 115. A voice call between user 125*a* of IP PBX 125 and a subscriber on another enterprise system's IP PBX or between user 125*a* of IP PBX 125 and a unified communication subscriber (such as a IP line subscriber), is controlled by one of the IP softswitches 105 or 110, which handle all routing and billing, even in situations where the voice call returns to the same unified communication server 120.

For calls between an enterprise user 125*a-c*, 130*a-c*, 135*a-c* and external PTSN users, these call sessions are managed by the IP softswitches 105, 110 and the unified communication server 120 of the unified communication system. More specifically, each of the enterprise system IP PBXs 125, 130, 135 interface with session manager 155, 160, 165 components of the unified communication server 120. Each session manager provides call processing services for an enterprise system. In certain embodiments, an enterprise system may be provided with call processing services by multiple session managers located on the same or geographically distributed unified communication servers. In the embodiment of FIG. 1, IP PBX 125 has been assigned to only session manager 155, IP PBX 130 has been assigned to both session manager 160 and 165, while IP PBX 135 has been assigned to use all three session managers, 155, 160 and 165. Session managers are assigned to an IP PBX based on available session manager capacity. In certain embodiments, each enterprise system is associated with a single session manager.

Each session manager of the unified communication server 120 manages call sessions for an enterprise system. In the case of an outgoing call from an internal user 125*a-c*, 130*a-c*, 1.35*a-c* to an external PTSN user 115, the unified communication server 120 receives the call request from an IP PBX. For instance, a call request from a user 125*a* of an enterprise system is received by an IP PBX 125 providing IP telephony services to the enterprise system. Unified communication server 120 includes a session manager 155 that has been assigned to enterprise system's IP PBX 125. Upon receiving a call request, the session manager 155 secures the use of a channel from the set of available SIP trunk channels. In certain embodiments, the unified communication server 120 selects a channel within the trunk group that corresponds to the target enterprise system (i.e., rate center) and routing required by the call. As described above, in conventional communication systems, a component such as the unified communication server 120 would route calls from user 125*a* using a SIP trunk dedicated for use by the enterprise system of IP PBX 125.

In the embodiment of FIG. 1, the unified communication system has been configured to share the capacity of SIP trunk groups 170 and 175 between the enterprise systems of IP PBXs 125, 130 and 135. Configured in this manner, SIP trunk groups 170 and 175 form a pool of trunk groups, where each trunk group in the pool provides a specific number of channels. In some embodiments, each trunk group supports up to 2046 channels. A trunk group pool can be comprised of any number of trunk groups that are required to satisfy the total capacity required for the traffic to and from a unified communication server 120. The unified communication server 120 is responsible for determining whether a channel is available with the shared SIP trunk groups 170 and 175. In the above example where enterprise user 125*a* issues a call request to the unified communication server 120 via the enterprise IP PBX 125, session manager 155 processes the PTSN call destination 115 information. The unified communication server 120 of the embodiment of FIG. 1 utilizes a channel manager 185 component to manage the channel capacity that is available. A call request is received by the channel manager 185, which then selects a channel from the available channels in the shared SIP trunk groups 170 and 175.

In certain instances, the unified communication server 120 will select a SIP trunk from the available shared group of SIP trunks that provides the most direct communication pathway to the PTSN call destination 115. For instance, if softswitch 110 is geographically closer to the PTSN call destination 115, the session manager 155 will select a channel from shared SIP trunk group 175. However, another advantage provided by sharing SIP trunk groups between enterprises systems is the increased number of communication pathways that may be available to an enterprise when compared to conventional systems. For instance, if the enterprise system of IP PBX 125 did not share SIP trunk groups and retained exclusive use of only a single SIP trunk connected to softswitch 105, any problems in that softswitch or in the single SIP trunk—either due to a technical issues or due to capacity constraints—would result in call blocking. In the illustrated embodiment, the unified communication server 120 may be configured to utilize all SIP trunk channels that are being shared by an enterprise in order to terminate calls to or from that enterprise. Thus, in the embodiment of FIG. 1, the unified communication server 120 is able to utilize channels from both shared SIP trunk group 170 and 175.

As described, individual enterprises may be limited in the number of channels that they can use at one time. In the embodiment of FIG. 1, this enterprise channel limit is enforced by the session manager assigned to the enterprise. For instance, session manager 155 is responsible for calls to and from the enterprise system of IP PBX 125. When a call request is received from IP PBX 125, one of the responsibilities of channel manager 185 is to deter nine whether the call would cause the enterprise of IP PBX 125 to exceed its enterprise channel limit. While sharing of the SIP trunk group provides the enterprise with a greater number of different channels at its disposal, the number of simultaneous sessions for which the enterprise is authorized is still limited to its channel limit. In certain embodiments, if the channel manager 185 determines in response to a call request that an enterprise is already at its channel limit, the unified communication server 120 notifies the user making the request that no communication channel is presently available. In certain embodiments, the user receiving such notification may be provided the option of being further notified when a channel becomes available.

Although enterprises benefit from sharing SIP trunk groups by sharing the cost of the SIP trunks with other enterprises, the sharing enterprises must still provide enterprise users with acceptable levels of service availability and quality of service. Certain embodiments provide the ability for unified communication systems to provide configurable sharing of SIP trunk groups. Certain embodiments of the claimed invention provide the ability to configure shared SIP trunk groups such that substantial benefits of sharing can be attained while still providing certain guarantees of capacity to participating enterprise systems.

Figure 2:
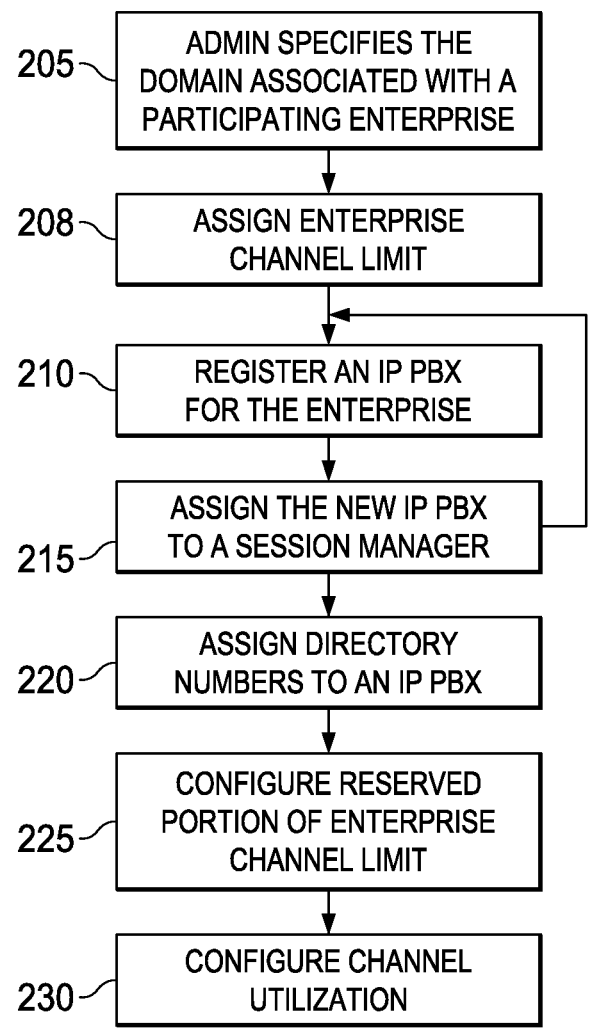
FIG. 2 is a sequence diagram illustrating certain steps by which a SIP trunk group is configured for sharing according to various embodiments.

In the embodiment of FIG. 1, a remote administrator 100 is provided with tools for configuring shared SIP trunk groups and for modifying various aspects of the sharing of the SIP trunk group as circumstances warrant. As enterprises evolve, the sharing of SIP trunk groups must likewise be re-configured. FIG. 2 illustrates certain steps by which an administrator of a unified communication systems, such as the remote administrator 100 of the embodiment of FIG. 1, can configure shared SIP trunk groups according to certain embodiments.

In certain embodiments, the remote administrator 100 may begin at step 205 by configuring the unified communication system to recognize the Internet domain used by an enterprise that will be utilizing a shared SIP trunk group. The tool allows remote administrator 100 to issue a command that specifies an internet domain identifying an enterprise that will be provided IP telephony services via the unified communications server 120. In certain embodiments, a command specifying the internet domain of an enterprise system results in configuration data being transmitted to the unified communication server 120 and the softswitches 105, 110 that are connected via SIP trunks.

The individual session managers 125, 130, 1135 of the unified communication server 120 use this domain information provided at step 205 to identify call data intended for the enterprise system with which the sessions manager is associated. Configuration of dedicated session managers for each enterprise allows the session manager to implement accounting methods for tracking fees to be charged to the enterprise based on call sessions. Since the shared trunk groups 170, 175 provide access to PTSN system, call sessions may accrue charges based on services provided by the PTSN system. The session managers 125, 130, 135 can intemperate to track any such charges on an enterprise basis, as well as implement any other accounting practices necessary for treating an enterprise as a separate rate center.

In certain embodiments, the process will continue at step 208 with the configuration of an enterprise channel limit associated with the newly registered domain. As described, an enterprise may be limited to a maximum number of simultaneous communication sessions. This limit is represented by the unified communication server 120 as a limit on the number of channels that may be utilized by the enterprise and is enforced by the channel manager 185. In certain embodiments, the remote administrator 100 is provided with commands that transmit configuration information specifying an enterprise channel limit to the appropriate unified communication server 120 associated with the enterprise.

Certain embodiments utilize an audit component to determine the accuracy of the channel manager's enforcement of the enterprise channel limits. The channel manager tracks the number of simultaneous sessions that are in use by an enterprise at any one time. The channel manager tracks the number of sessions that have been allocated to an enterprise by maintaining a channel usage count for each enterprise. If a session request is received by the channel manager and channels are determined to be available for use by an enterprise, a channel is allocated and the channel usage count is incremented. In some embodiments, the channel usage count is incremented up receipt or dispatch of a SIP INVITE message such that a SIP dialog is created. When the session is terminated, the channel is deallocated and the channel usage count is decremented. In certain embodiments, a channel is not allocated and the channel usage count is not updated when a session is placed on hold by the end user, thus leaving the session immediately retrievable by the end user. In certain embodiments, a channel is allocated and the channel usage count is updated upon a session request to a user that is already in a session, even though the user may not accept the new session request. Embodiments may vary with respect to updating the channel usage count upon receipt or dispatch of a SIP REFER message, which may be used for transferring calls to another subscriber within the same enterprise. In certain embodiments, the channel manager may be configured to permit emergency calls above the enterprise channel limit using any available channels.

When a new sessions between service provider and enterprise are requested, the channel manager utilizes the enterprise channel limit and the current channel usage count for the enterprise to determine whether an additional channel can be allocated for the enterprise. In order to determine the accuracy of the channel usage count information relied upon by the channel manager in enforcing channel limits, the audit component compares the number of simultaneous SIP dialogs with the current channel usage count. In various embodiments, the audit process may run manually and/or periodically. If a discrepancy is consistently detected over multiple audit cycles, the issue can be reported for further investigation.

Once an Internet domain of an enterprise system has been registered by the remote administrator 100, certain embodiment will continue at step 210 with the registration of one or more IP PBXs that are associated with the enterprise system that will be provided IP telephony service by the unified communications server 120. According to various embodiments, the remote administrator 100 is provided with tools that allow a single command to be issued that specifies an IP PBX of an enterprise system and the Internet domain of the enterprise. This command serves to register the IP PBX with the unified communication system.

The command issued by the remote administrator 100 specifying an IP PBX of an enterprise system results in configuration data being transmitted to the unified communication server 120 and the softswitches 105, 110 that are connected via SIP trunks. At step 215, this configuration data is then used by the unified communication server 120 to assign a session manager to manage communications sessions on behalf of the newly registered IP PBX. As required to meet the demand from the enterprise for communication channels, additional session managers may be further assigned to manage communication sessions with the newly registered IP PBX. Certain embodiments of the unified communication server 120 respond to a request for a communication channel by identifying a session manager with available capacity to manage the requested communication session. Once configured, the assigned session managers interoperate to track the call activity of an enterprise system as a distinct rate center. In the embodiment of FIG. 1, three different IP PBX's 125, 130, 135 have been registered with the unified communication server 120, each of the IP PBXs being associated with different enterprise systems.

In some scenarios, more than one session manager may be utilized to provide the communication channels that are required by a single enterprise system. Each session manger has a finite capacity with regard to the number of simultaneous voice calls that can be supported. In certain embodiments, the remote administrator 100 is provided with the ability to configure the number of channels that can be supported by a session manager. Certain embodiments provide the remote administrator 100 with ability to re-assign certain enterprise IP PBXs associated with a session manager to a different session manager, in order to alleviate and/or balance the load on the session managers. Certain embodiments provide the remote administrator 100 with the ability to specify policies that direct the automatic re-assignment of an enterprise IP PBX to a different session manger by the unified communication server 120. Such policies may specify a capacity threshold for a session manager and such policies may further specify that if the session manager capacity falls below the threshold, one or more of the enterprise PBXs assigned to the session manager are reassigned.

The configuration process continues at step 220 with the registration of one or more directory numbers with the newly added IP PBX. Each directory number identifies an enterprise user that is supported by the IP PBX. In the embodiment of FIG. 1, this directory number configuration identifies users 125*a-c* as authorized to issue call request via the PBX 125 and directs the unified communication server 120 to property route incoming call request directed to users 125*a-c*. In order to terminate the incoming call request to an enterprise user 1250*a-c* associated with a provided directory number, the unified communication server 120 selects from the available session managers 155, 160, 165. The unified communication server 120 may select a session manager based on current capacity of the available session managers. In the embodiment of FIG. 1, the unified communication server 120 has configured session managers 155 and 160 to manage one or more communication sessions on behalf of IP PBX 125. In certain embodiments, the remote administrator 100 is provided with tools by which a directory number or range of directory numbers can be configured as being associated with an IP PBX.

In certain embodiments, the configuration process of FIG. 2 continues at step 225 with the remote administrator 100 configuring policies for sharing the channels available in the shared SIP trunk group among the participating enterprise systems. As described, even though enterprises may share SIP trunk groups, enterprises may still require certain amounts of guaranteed calling capacity. In certain embodiments, the provisioning tools provided to remote administrator 100 allow configuration of capacity allocation and resource utilization within a shared SIP trunk group managed by the unified communication system.

In certain embodiments, the tools provided to the remote administrator 100 can be used to configure how the channels of a shared SIP trunk group may be allocated between the participating enterprises. For enterprises that require service availability guarantees, the remote administrator 100 can specify a percentage of the enterprise channel limit that remains reserved for use by the enterprise and is not shared within the shared SIP trunk group. With respect to FIG. 1, the remote administrator 100 can specify that the enterprise of IP PBX 125 requires that 50% of the enterprise's channel limit is not shared. Configured in this manner, the channel manager 185 shares the remaining 50% of this enterprise's channel limit within the shared SIP trunk group.

Since remote administrator 100 can adjust these channel availability configuration on a per-enterprise basis, the remote administrator 100 can create groupings of enterprises in a shared SIP trunk group in a manner that promotes mutual interests while maximizing resource utilization. By way of example, a regional bank with an enterprise IP telephony system may require that a minimum calling capacity must be maintained during business hours in order to guarantee satisfactory customer service. Such an enterprise could be paired in a shared SIP trunk group that is unlikely to generate conflicting patterns of usage of the shared SIP trunk group capacity. For instance, the regional bank could be paired with a call center enterprise in a different time zone that typically has peak utilization at different hours from the regional bank. In this manner, resource utilization can be increased while mitigating the risk of degradation in service. Embodiments provide a remote administrator 100 with tools by which the behavior of the unified communication system can be easily re-configured as new opportunities for increasing resource utilization become available.

For instance, the regional bank of the above example may instead by paired with an international call center that may be willing to accept an uneven allocation of the shared SIP trunk group. The regional bank may still maintain a non-shared reserve of 50% of the bank's enterprise channel limit. If the international call center is willing to retain no channels in reserve, then the international call center's full channel limit may be used within the shared SIP trunk group at any time. For such an allocation of shared SIP trunk group channels, the regional bank could be charged a premium and/or the call center could be provided a discount. With the tools provided by embodiments, a remote administrator 100 can pursue modifications to improve the combination of enterprises in individual shared SIP trunk groups and the channel availability provided to different enterprises within a shared SIP trunk group. Certain embodiments may provide the ability to dynamically adjust the allocation of channel capacity between the participating enterprises based on established usage patterns by one or more of the enterprises.

The configuration process may continue at step 230 by the remote administrator 100 using the provided tools to specify the amount of SIP trunk capacity that should remain available for use by participants of ongoing calls. Once the IP PBX and the unified communication server 120 have negotiated a communication session on behalf of a user of the IP PBX's enterprise system, additional channels could be required to support certain IP telephony or other unified communication features. For instance, if user 125a has established a voice call with a FINN user 115 and these parties desire to conference in an additional PTSN participant to the voice call, an additional channel will be required to support this expansion of the current communication session. Many other possible IP telephony and unified communication features may likewise require expansion of an ongoing session to require additional channels. In order to support such features, the channel manager 185 must be configured to retain a portion of the shared SIP trunk group capacity in reserve. These channels held in reserve are not utilized by the channel manager 185 for establishing new sessions, but are instead only available for use in ongoing sessions. In certain embodiments, the remote administrator 100 is provided with configuration tools by which a percentage of the shared SIP trunk group capacity is held in reserve for such expansion features. In certain embodiments, this reserve channel capacity held for expansion may be configured on a per-enterprise basis, such that each enterprise has a certain number of channels for their exclusive use. Certain embodiments may dynamically adjust the allocation of reserved channel capacity held for expansion based on established usage patterns by one or more of the participating enterprises.

The invention claimed is:

1. A method for configuring a communication network, the method comprising:
    registering a first PBX (Public Branch Exchange) as part of a first enterprise communication system operated by a first enterprise;
    registering a second PBX as part of a second enterprise communication system operated by a second enterprise;
    selecting the first and second enterprises based upon a first time zone of the first enterprise communication system and a second time zone of the second enterprise communication system;
    assigning a first resource pool for shared use by the first plurality of digital PBXs and the second plurality of PBXs, wherein the first resource pool includes communication resources associated with the second PBX for shared use between the first and second enterprise communication systems for providing communication services to the first plurality of digital PBXs and the second plurality of digital PBXs;
    specifying a first portion of the communication resources that are reserved for use by the first PBX;
    assigning a second portion of the communication resources for dedicated use by the second enterprise communication system, wherein the first portion of the communication resources provides a number of communication channels above a maximum number of channels allowed for use by the first enterprise communication system;
    enforcing the maximum number of channels allowed for use by the first enterprise by limiting a number of shared channels in the shared communication resources that are available to the first enterprise communication system; and
    permitting an emergency communication at the first enterprise using a number of channels above the maximum number of channels allowed for use by the first enterprise communication system.

2. The method of claim 1, further comprising:
    specifying a first maximum number of communication resources that may be simultaneously used by the first and second enterprise communication systems.

3. The method of claim 2, wherein the number of resources in the first portion of the communication resources is specified as a percentage of the first maximum number of communication resources.

4. The method of claim 1, further comprising:
    reserving a subset of the first communication resources to be used for expanding ongoing communications by the first enterprise communication system.

5. The method of claim 1, wherein the first enterprise communication system is associated with a first internet domain and the second enterprise communication system is associated with a second internet domain.

6. The method of claim 1, further comprising:
    specifying one or more directory numbers associated with the first PBX.

7. The method of claim 1, further comprising:
reassigning the first PBX to a second communication resource group in response to detecting insufficient capacity in a first communication resource group.

8. A system, comprising:
a processor; and
a memory coupled to the processor, the memory including computer-readable instructions that, upon execution by the processor, cause the system to:
  register a first PBX (Public Branch Exchange) as part of a first enterprise communication system operated by a first enterprise;
  register a second PBX as part of a second enterprise communication system operated by a second enterprise;
  select the first and second enterprises based upon a first time zone of the first enterprise communication system and a second time zone of the second enterprise communication system;
  assign a first resource pool for shared use by the first plurality of digital PBXs and the second plurality of PBXs, wherein the first resource pool includes communication resources associated with the second PBX for shared use between the first and second enterprise communication systems for providing communication services to the first plurality of digital PBXs and the second plurality of digital PBXs;
  specify a first portion of the communication resources that are reserved for use by the first PBX;
  assign a second portion of the communication resources for dedicated use by the second enterprise communication system, wherein the first portion of the communication resources includes a number of communication channels above a maximum number of channels allowed for use by the first enterprise communication system;
  enforce the maximum number of channels allowed for use by the first enterprise by limiting a number of shared channels in the shared communication resources that are available to the first enterprise communication system; and
  permit an emergency communication at the first enterprise using a number of channels above the maximum number of channels allowed for use by the first enterprise communication system.

9. The system of claim 8, wherein the computer-readable instructions, upon execution by the processor, cause the system to:
  specify a first maximum number of communication resources that may be simultaneously used by the first and second enterprise communication systems.

10. The system of claim 9, wherein the number of resources in the first portion of the communication resources is specified as a percentage of the first maximum number of communication resources.

11. The system of claim 8, wherein the computer-readable instructions, upon execution by the processor, cause the system to:
  reserve a subset of the first communication resources to be used for expanding ongoing communications by the first enterprise communication system.

12. The system of claim 8, wherein the first enterprise communication system is associated with a first internet domain and the second enterprise communication system is associated with a second internet domain.

13. The system of claim 8, wherein the computer-readable instructions, upon execution by the processor, cause the system to:
  specify one or more directory numbers associated with the first PBX.

14. The system of claim 8, wherein computer-readable instructions, upon execution by the processor, cause the system to:
  reassign the first PBX to a second communication resource group in response to detecting insufficient capacity in a first communication resource group.

* * * * *